Aug. 26, 1947.  L. MONTROSE  2,426,321
FLUID TRANSMISSION APPARATUS
Filed June 20, 1945  2 Sheets-Sheet 1
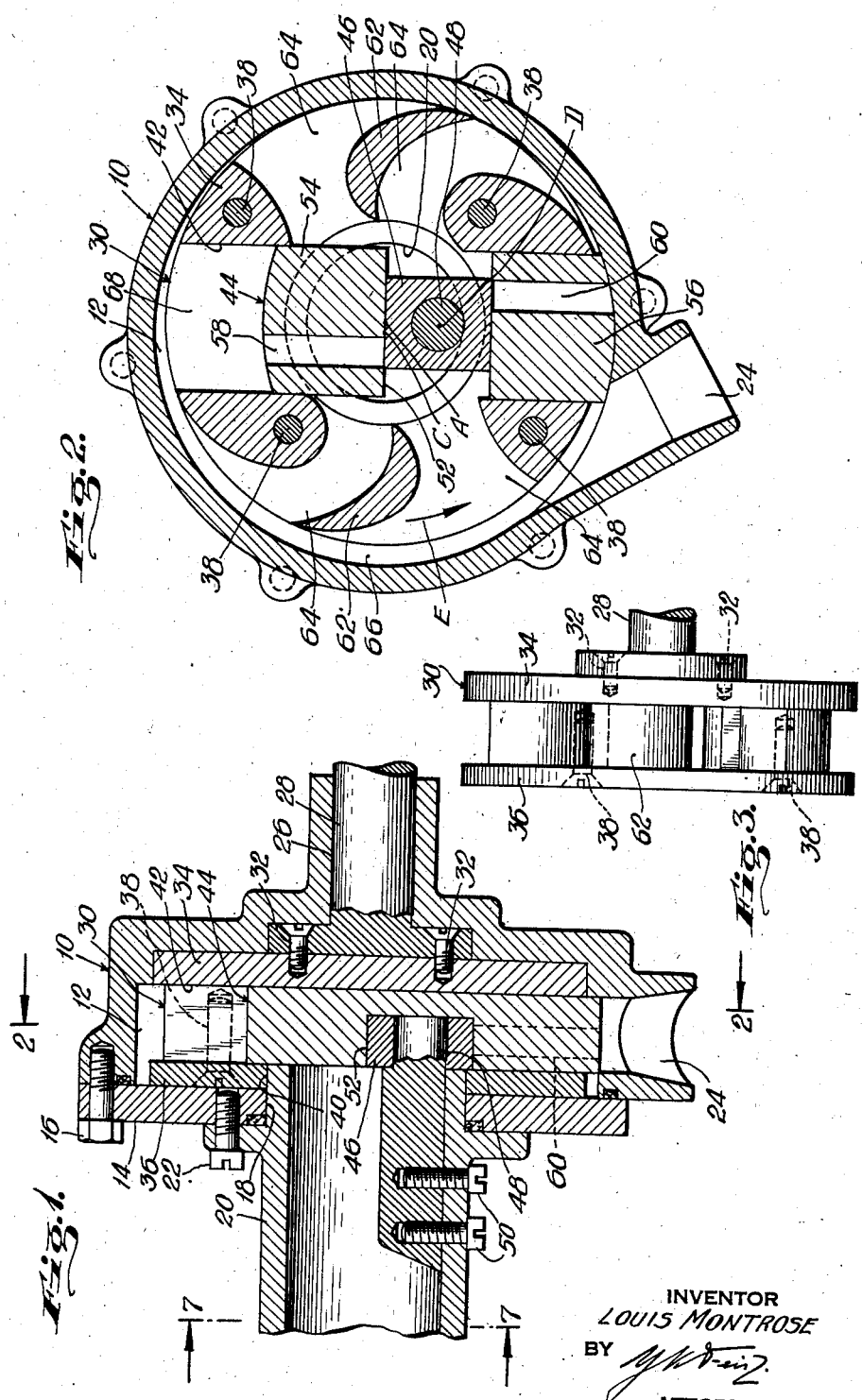
INVENTOR
*LOUIS MONTROSE*
BY
ATTORNEY

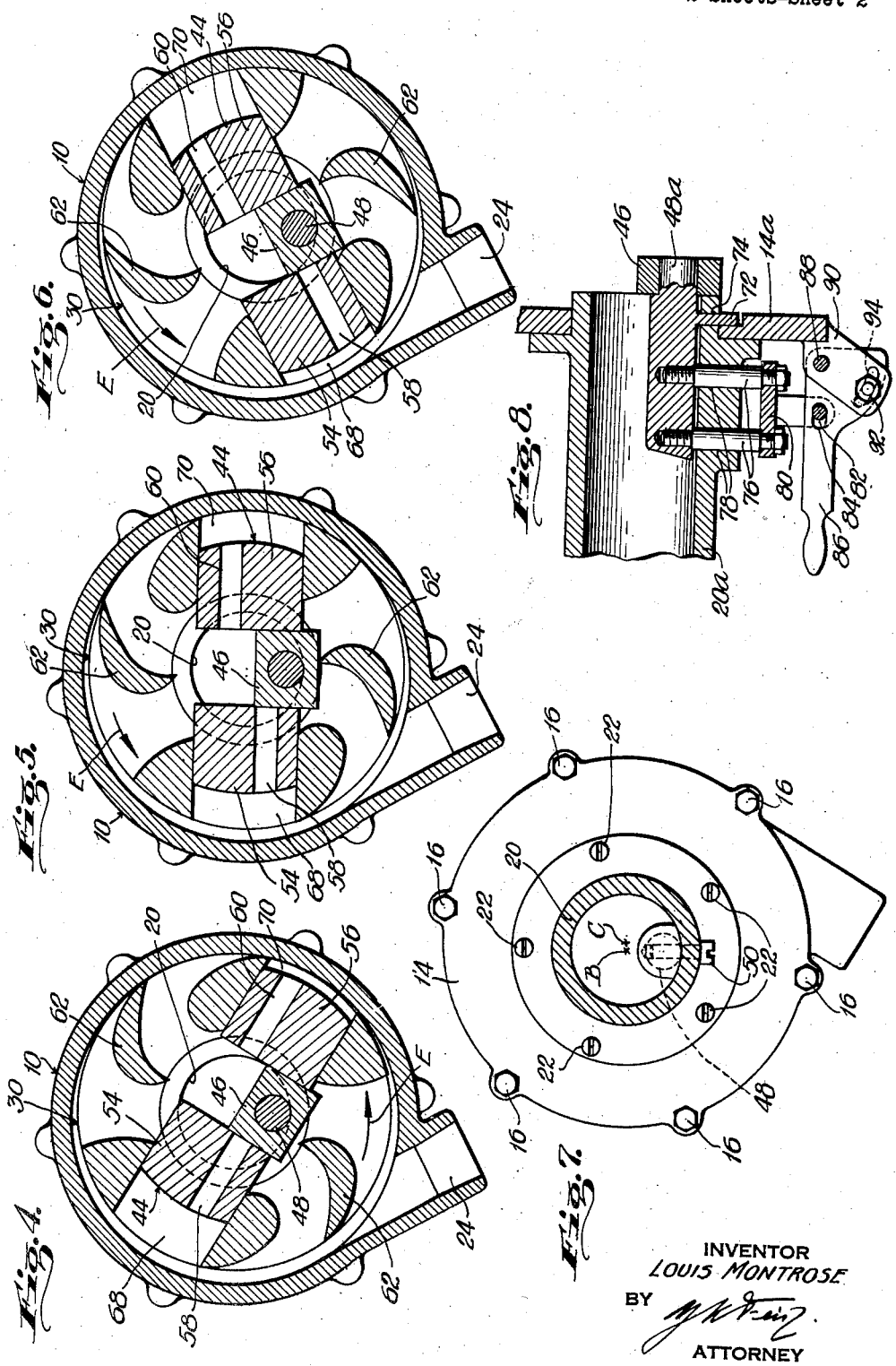

Patented Aug. 26, 1947

2,426,321

UNITED STATES PATENT OFFICE 2,426,321

FLUID TRANSMISSION APPARATUS

Louis Montrose, Brooklyn, N. Y.

Application June 20, 1945, Serial No. 600,492

5 Claims. (Cl. 103—4)

My invention relates to fluid transmission apparatus, and more particularly to pumps having a rotor.

An object of my invention is to provide an extremely simple and highly efficient pump.

Another object of my invention is to provide a pump capable of delivering a great quantity of liquid at a high pressure.

A further object of my invention is to provide simple means for varying the discharge of a pump of above described type.

Another object of my invention is to improve upon pumps now ordinarily made.

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

Fig. 1 is a vertical sectional view of a pump according to the invention,

Fig. 2 is a sectional view of the pump, taken on line 2—2 of Fig. 1,

Fig. 3 is an elevational view of the rotor of the pump,

Figs. 4–6 are sectional views of the pump corresponding to Fig. 1 illustrating, however, the rotor in various different positions, Fig. 7 is a sectional view of the pump taken on line 7—7 of Fig. 1, and Fig. 8 is a sectional view of a modification of a detail illustrating means for adjusting the discharge of a pump according to the invention.

Referring now to the drawings, 10 generally indicates the casing of a pump having a cylindrical compartment 12. The casing 10 is closed by a cover 14 screwed thereon by screws 16. The cover 14 has an eccentric bore 18 receiving a tubular member 20 screwed to said cover 14 by means of screws 22. The tubular member 20 forms the inlet passage for the liquid. The casing 10 has at its circumference an outlet 24 communicating with the cylindrical compartment 12. Furthermore, the casing 10 has a bore 26 opposite the opening 18 of the cover 14. The cylindrical axis A (see Fig. 2) of said bore 26 is in line with the center B (see Fig. 7) of the tubular member 20 and is eccentric to the central axis C (Figs. 2 and 7) of the casing 10. Said bore 26 receives the flanged end of a rotatable driving shaft 28 which may be connected with a suitable driving device (not shown).

A cylindrical rotor generally indicated by 30 arranged within the cylindrical compartment 12 of the casing 10 is secured to the flanged end of the driving shaft 28 by means of screws 32 in such a way, that its center is in line with the longitudinal axis A of the bore 26 and is eccentric to the central axis C of the casing 10. Said rotor 30 comprises a body 34 and a plate 36 screwed thereto by means of screws 38. The plate 36 has an opening 40 in engagement with a portion of the tubular member 20, extending into the compartment 12 and acting as a bearing for the rotor.

The body 34 of the rotor 30 has a seat 42 extending diametrically thereof. A piston generally indicated by 44 is slidably arranged in said seat 42. A coupling head 46 rotatably mounted on a trunnion 48 secured to the tubular member 20 by means of screws 50 is in slidable engagement with an intermediate transverse recess 52 of the piston 44. Said recess 52 faces the inlet passage 20 and communicates with the latter. The axis D (Fig. 2) of the trunnion 48 is eccentric to the axis A of the bore 26 and rotor 30. Each of the portions 54, 56 of the piston 44 formed on the sides of said transverse recess 52 is provided with a channel 58, 60 extending between said recess 52 and the circumference of the piston.

Furthermore, the body 34 of the rotor 30 is provided with a plurality of impeller blades 62, and a plurality of impeller passages 64. The inner end of said impeller passages communicates with the inlet passage 20.

The eccentric arrangement of the axis A of the rotor 30 relative to the axis C of the casing 10 results in a space 66 between the circumference of the rotor and the inner wall of the casing, which communicates with the outlet 24 for the discharge of the fluid, and the eccentric arrangement of the axis D of the trunnion relative to the axis A of the rotor causes reciprocating movements of the piston 44 in the seat 42 when the rotor is rotated in the direction of the arrow E. The reciprocating movements of the piston are illustrated by Figs. 2, 4, 5 and 6 showing various positions of the rotor 30 and the piston 44 during a rotation of the rotor. Furthermore, as will be recognized from said figures, the piston 44 performs reciprocating movements relative to the coupling head 46 during rotations of the rotor 30. During such relative movements between the piston 44 and the coupling head 46, the coupling head controls the openings of the channels 58, 60 in the piston.

The operation of the pump is as follows:

In the position of the rotor 30 shown in Fig. 2, the channels 58 and 60 are closed by the coupling head 46. When the rotor is rotated in the direction of the arrow E, the channel 58 remains closed, until, after a rotation through 180°, the channel 58 passing through the positions shown in Figs. 4–6 reaches the position of the channel 60 shown in Fig. 2. When the portion 54 with the channel 58 is in the position shown in Fig. 2, the space 68 between the circumference of the piston 44 and the space 66 of the chamber 12 is filled with liquid. Therefore, in view of above mentioned closing of the channel 58, the liquid being in said space 68 is discharged into said space 66 and thence into the outlet 24, when during a rotation of the rotor through 180° the portion 54 of the piston 44 is moved relative to the rotor 30 from the position shown in Fig. 2 through the positions shown in Figs. 4–6 into the position, occupied by the portion 56 of the piston as shown in Fig. 2.

Furthermore, during a rotation of the rotor through 180° from the position shown in Fig. 2, the coupling head 46 opens the channel 60, until the latter reaches the position occupied by the channel 58 in Fig. 2. Therefore, in view of the movement of the portion 56 of the piston relative to the rotor during such a rotation of the rotor, liquid is sucked from the inlet passage into the space 70 being formed between the portion 56 of the piston and the inner wall of the chamber 12 during the rotation illustrated by Figs. 4–6.

When, after the thus described rotation through 180° the piston 56 is rotated through the positions shown in Figs. 4–6 into the position occupied by the portion 54 in Fig. 2, and the rotation of the rotor is continued, the liquid sucked into the space 70 during the rotation through the positions illustrated by Figs. 4–6, is discharged into the outlet 24 as described above in connection with liquid being in the space 68 and being discharged by the portion 54 of the piston.

Simultaneously with the operation of the piston 44, liquid is sucked from the inlet passage 20 and discharged into the outlet passage 24 by the impeller blades 62 of the rotor 30.

As shown in Fig. 2, the eccentricity A—D is perpendicular to the eccentricity A—C, so that the space 68 communicates with a rather thin portion of the crescent-like area 66 at the beginning of the discharging stroke of the piston 44; during a rotation of the piston from the position shown in Fig. 2 in the direction of the arrow E, the liquid is discharged from the space 68 into slowly increasing portions of the crescent-like area 66, whereby a pulsating effect of the pump is eliminated. The pressure of the liquid created by the piston is substantially uniform throughout, and this uniform pressure is superimposed on the likewise substantially uniform but lower pressure of the liquid created by the impeller blades 62. Thus, the fluid transmitting elements of the rotary pump formed by the rotor 30 with the reciprocating piston 54 and the fluid transmitting elements of the centrifugal pump formed by the same rotor 30 with the impeller blades 62 are arranged in such a way, that they operate in parallel, i. e. that the displacement capacities of the rotary pump and of the centrifugal pump are additively combined in an aggregative delivery capacity. This feature permits a delivery of a great quantity of liquid by the pump according to the invention at a high pressure without pulsating effect.

Furthermore, it is mentioned that the inlet of the liquid at the center of the pump reduces the lubrication of moving elements to a minimum, as practically all moving elements are surrounded by the liquid.

The pump shown in Figs. 1–7 is not equipped with means for adjusting the discharge of the pump. If desired, however, means for varying the discharge of the pump may be arranged in a pump according to the invention. Fig. 8, for example, illustrates such adjusting means. According to Fig. 8, the trunnion 48a carrying the coupling head 46 has an extension 72 slidably arranged in an opening 74 of the tubular member 20a forming the inlet passage. Furthermore, bolts 76 screwed into threaded bores of the trunnion 48 are slidably arranged in bores 78 of the member 20a. The free ends of said bolts 76 are connected with an element 80 carrying a pin 82 in engagement with an elongated slot 84 in a lever 86 pivoted at 88 to a lug 90 arranged on the cover 14a of the pump. A swinging of the lever 86 about its pivot 88 causes a movement of the trunnion 48a towards or away from the longitudinal axis of the tubular member 20 being in alignment with the axis of the rotor. Therefore, such a movement of the lever 86 causes a variation in the eccentricity of the trunnion 48a relative to the axis of the rotor, which, in turn, results in a variation of the delivery of liquid by the action of the piston. The lever 86 may be held in the desired position by means of a screw 92 passing through a bore of the lug 90 and a slot 94 of the lever 86. It is understood, that the elements of the pump proper not shown in Fig. 8 correspond to the elements of the pump shown in Fig. 1.

I have described preferred embodiments of my invention, but it is to be understood that all matter hereinbefore set forth or shown in the accompanying drawings is to be interpreted as illustration and not in a limiting sense, as many changes and omissions may be made without departing from the spirit of my invention.

What I claim is:

1. A fluid transmission apparatus comprising: a casing having a compartment therein, an inlet passage connected with said compartment, an outlet passage connected with said compartment, a rotor eccentrically mounted in said compartment relative to the central axis thereof, means connected with said rotor for rotating same, said rotor having a seat extending diametrically thereof, a piston slidably mounted in said seat, said piston having an intermediate transverse recess, and a coupling head slidably mounted in said recess, said coupling head being rotatable about an axis eccentric to the axis of the rotor and being held in engagement with said recess, said rotor having a plurality of impeller blades, said rotor thus forming the rotor of a rotary pump and the impeller of a centrifugal pump, and the fluid transmitting elements of said rotary pump and said centrifugal pump communicating with said inlet passage and said outlet passage, whereby the displacement capacities of said rotary pump and of said centrifugal pump are additively combined in an aggregate delivery capacity.

2. A fluid transmission apparatus as claimed in claim 1, said coupling head being rotatably mounted on a trunnion arranged eccentrically to the axis of the rotor, and adjusting means associated with said trunnion for adjusting its eccentricity relative to the axis of the rotor.

3. A fluid transmission apparatus comprising: a casing having a compartment therein, an inlet passage connected with the center portion of said compartment, an outlet passage connected with the circumference of said compartment, a rotor eccentrically mounted in said compartment relative to the central axis thereof, means connected with said rotor for rotating same, said rotor having a seat extending diametrically thereof, a piston slidably mounted in said seat, said piston having an intermediate transverse recess facing said inlet passage and communicating with the latter, each of the two portions of the piston thus formed on each side of said transverse recess having a channel extending between said recess and the circumference of the piston, and a coupling head slidably mounted in said recess, said coupling head being rotatable about an axis eccentric to the axis of the rotor and being held in engagement with said recess, said coupling head reciprocating in said recess during a rotation of the rotor and being arranged for controlling the openings of said channels at said recess, and said rotor having a plurality of impeller blades and impeller passages, the inner end of the latter communicating with said inlet passage.

4. A fluid transmission apparatus as claimed in claim 3, said coupling head being rotatably mounted on a trunnion arranged eccentrically to the axis of the rotor.

5. A fluid transmission apparatus as claimed in claim 3, said coupling head being rotatably mounted on a trunnion arranged eccentrically to the axis of the rotor, and adjusting means associated with said trunnion for adjusting its eccentricity relative to the axis of the rotor.

LOUIS MONTROSE.

REFERENCES CITED

The following references are of record in the file of this patent:

UNITED STATES PATENTS

| Number | Name | Date |
| --- | --- | --- |
| 559,324 | Dyer | Apr. 28, 1896 |
| 753,390 | Hamann | Mar. 1, 1904 |
| 1,729,764 | Dinesen | Oct. 1, 1929 |
| 1,839,485 | King | Jan. 5, 1932 |
| 1,918,408 | Lakin-Smith | July 18, 1933 |
| 2,045,330 | MacMillin | June 23, 1936 |
| 2,288,833 | Pascoe | July 7, 1942 |